United States Patent
Rguichi et al.

(10) Patent No.: US 10,138,962 B2
(45) Date of Patent: *Nov. 27, 2018

(54) DISC BRAKE AND BRAKE PAD SET FOR A DISC BRAKE

(71) Applicant: KNORR-BREMSE Systeme fuer Nutzfahrzeuge GmbH, Munich (DE)

(72) Inventors: Abdelaziz Rguichi, Olching (DE);
Philipp Adamczyk, Stoettwang (DE);
Matthias Klingner, Moorenweis (DE);
Alexander Werth, Munich (DE);
Michael Peschel, Schoengeising (DE);
Robert Theil, Tuerkenfeld (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/726,085

(22) Filed: Oct. 5, 2017

(65) Prior Publication Data

US 2018/0045256 A1    Feb. 15, 2018

Related U.S. Application Data

(63) Continuation of application No. 15/086,317, filed on Mar. 31, 2016, now Pat. No. 9,810,275, which is a
(Continued)

(30) Foreign Application Priority Data

Oct. 4, 2013 (DE) .......................... 10 2013 016 312

(51) Int. Cl.
*F16D 65/00* (2006.01)
*F16D 55/226* (2006.01)
(Continued)

(52) U.S. Cl.
CPC ....... *F16D 65/0068* (2013.01); *F16D 55/226* (2013.01); *F16D 55/2265* (2013.01);
(Continued)

(58) Field of Classification Search
CPC ............. F16D 65/0068; F16D 65/0056; F16D 65/092; F16D 65/095; F16D 55/226; F16D 55/2265
See application file for complete search history.

(56) References Cited

U.S. PATENT DOCUMENTS 3,166,158 A    1/1965   Burnett et al.
4,540,068 A    9/1985   Ritsema
(Continued)

FOREIGN PATENT DOCUMENTS

DE   14 50 077       8/1975
DE   38 05 994 A1    9/1989
(Continued)

OTHER PUBLICATIONS

International Search Report (PCT/ISA/210) issued in PCT Application No. PCT/EP2014/071037 dated Dec. 11, 2014, with English translation (four (4) pages).
(Continued)

*Primary Examiner* — Vishal R Sahni
(74) *Attorney, Agent, or Firm* — Crowell & Moring LLP

(57) ABSTRACT

A sliding caliper disk brake is provided, in which a stationary brake carrier configured to carry a brake caliper includes two pairs of carrier horns, one pair of which supports a reaction-side brake pad and one pair of which supports an application side brake pad. The spacing between the reaction-side pair of carrier horns is larger than the spacing between the application-side pair of carrier horns. The reaction-side brake pad and reaction-side pair of carrier horns may be shorter than the corresponding application-
(Continued)

side brake pad and carrier horns. The arrangement of the brake carrier, the brake caliper and the brake pads permits reduction in disk brake weight, cost and brake carrier stresses while providing desired brake thermal, mechanical and service life performance.

14 Claims, 9 Drawing Sheets

Related U.S. Application Data continuation of application No. PCT/EP2014/071037, filed on Oct. 1, 2014.

(51) Int. Cl.
 F16D 65/095 (2006.01)
 F16D 55/2265 (2006.01)
 F16D 65/092 (2006.01)
 F16D 55/00 (2006.01)

(52) U.S. Cl.
 CPC ....... *F16D 65/0056* (2013.01); *F16D 65/092* (2013.01); *F16D 65/095* (2013.01); *F16D 2055/0008* (2013.01); *F16D 2055/0016* (2013.01)

(56) References Cited

U.S. PATENT DOCUMENTS

| | | | |
|---|---|---|---|
| 4,781,272 A | 11/1988 | Sheill et al. | |
| 5,343,985 A | 9/1994 | Thiel et al. | |
| 5,701,978 A | 12/1997 | Weiler et al. | |
| 8,544,614 B1 * | 10/2013 | Plantan | F16D 65/092 188/250 B |
| 2004/0188188 A1 | 9/2004 | Barbosa et al. | |
| 2006/0289249 A1 | 12/2006 | Nishimura et al. | |
| 2007/0119665 A1 | 5/2007 | Barbosa et al. | |
| 2008/0067015 A1 | 3/2008 | Thomas et al. | |
| 2012/0298456 A1 | 11/2012 | Morris et al. | |
| 2015/0184710 A1 | 7/2015 | Peschel et al. | |

FOREIGN PATENT DOCUMENTS

| | | |
|---|---|---|
| DE | 10 2005 019 255 A1 | 11/2005 |
| DE | 20 2010 011 588 U1 | 11/2010 |
| DE | 10 2011 103 963 B3 | 9/2012 |
| DE | 10 2012 009 841 A1 | 11/2013 |
| EP | 0 119 888 A1 | 9/1984 |
| EP | 0 139 890 A1 | 5/1985 |
| EP | 0 329 831 B1 | 7/1991 |
| EP | 2 664 815 B1 | 4/2015 |
| JP | 7-139570 A | 5/1995 |
| JP | 2002-295538 A | 10/2002 |
| JP | 2008-214467 A | 9/2008 |
| SU | 833026 A | 5/1985 |
| WO | WO 2014/041157 A1 | 3/2014 |
| WO | WO 2014/041161 A1 | 3/2014 |

OTHER PUBLICATIONS

German Office Action issued in counterpart German Application No. 10 2013 016 312.9 dated Jun. 10, 2014 (eight (8) pages).
International Preliminary Report on Patentability (PCT/IB/326, PCT/IB/338 & PCT/IB/373) including Written Opinion (PCT/ISA/237) issued in PCT Application No. PCT/EP2014/071037 dated Apr. 14, 2016 with English translation (15 pages).
Japanese-language Office Action issued in counterpart Japanese Application No. 2016-519905 dated Apr. 3, 2017 with English translation (9 pages).
Russian-language Office Action issued in counterpart Russian Application No. 2016117164/11 (026978) dated Jun. 5, 2017 with English translation (Fourteen (14) pages).
German-language European Search Report issued in counterpart European Application No. 17174085.5 dated Oct. 26, 2017 with partial English translation (Eight (8) pages).

* cited by examiner

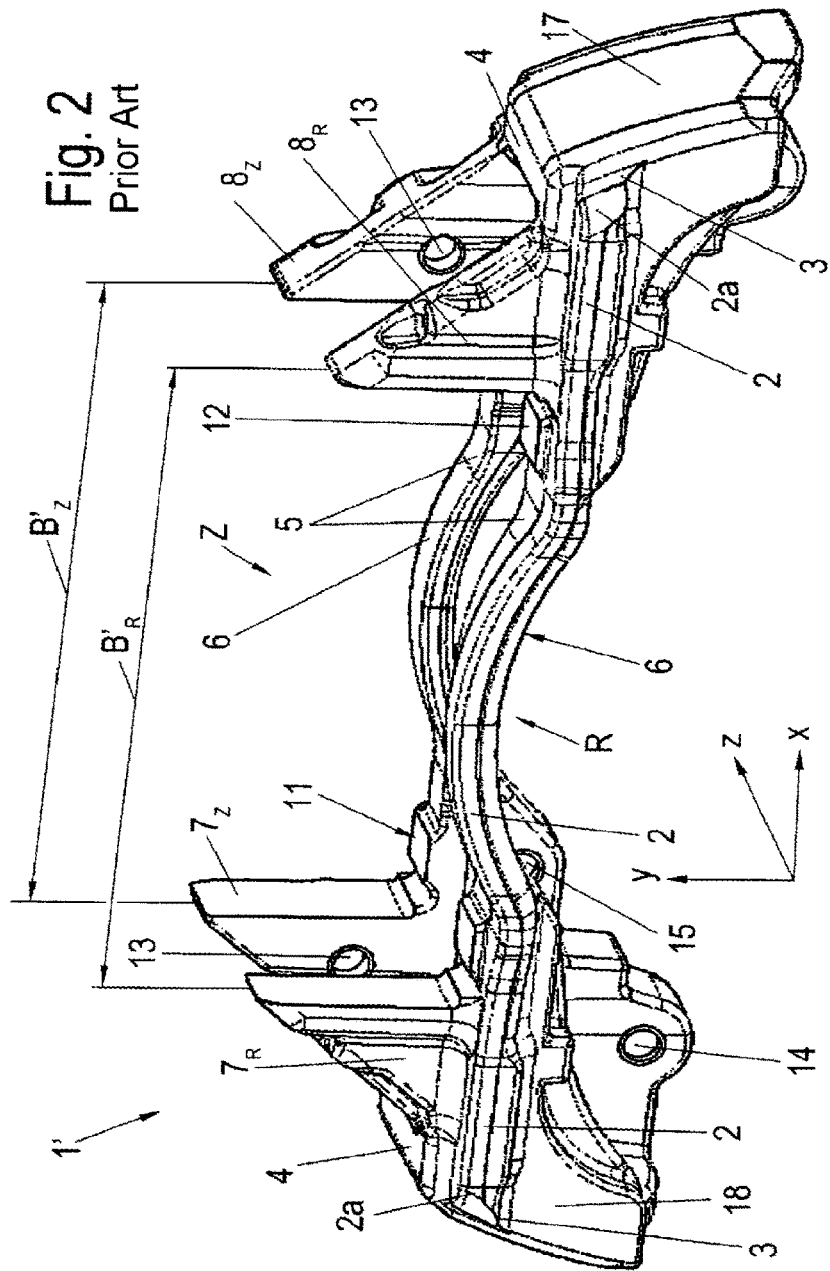

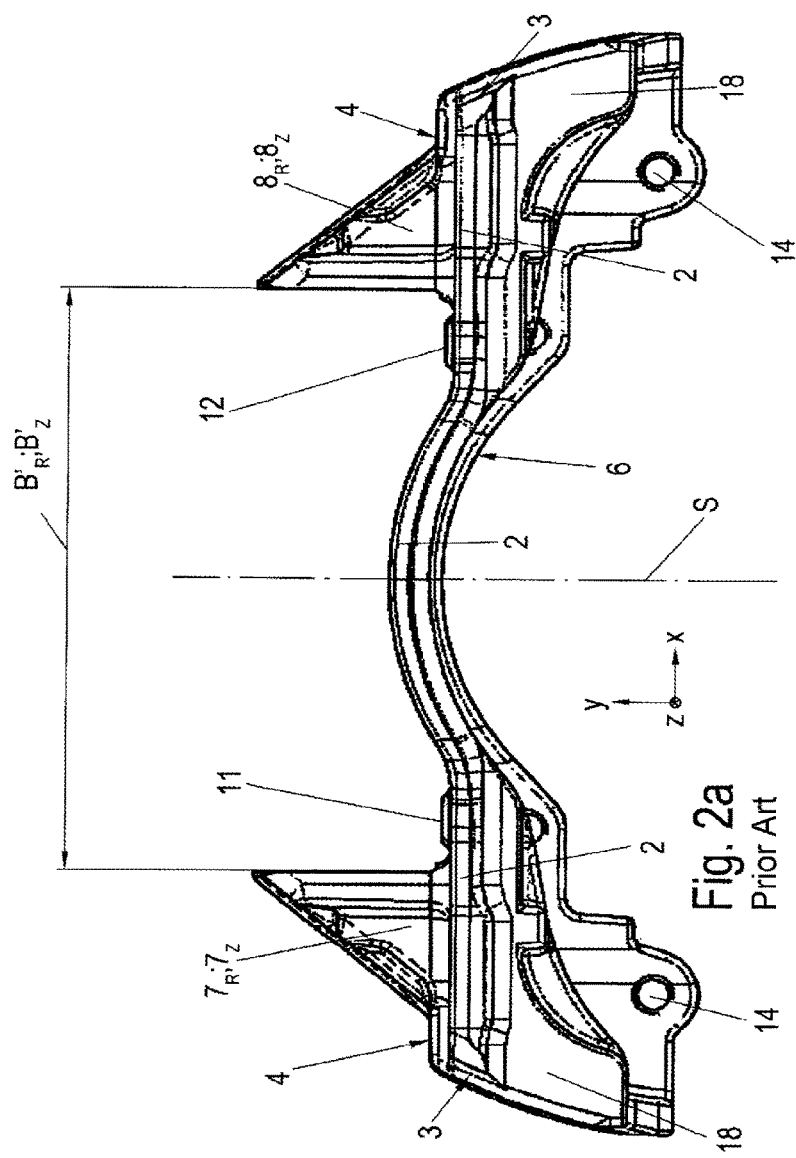

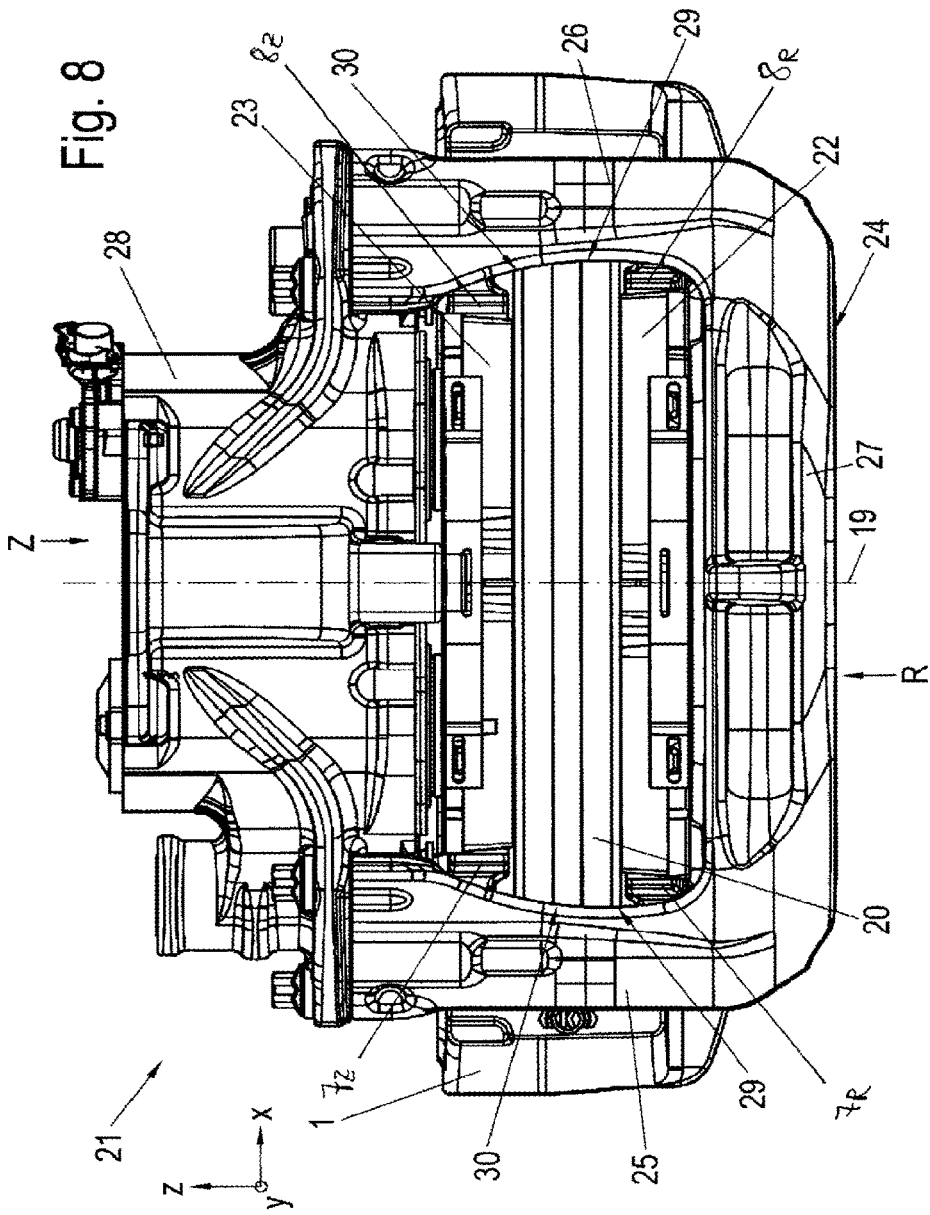

DISC BRAKE AND BRAKE PAD SET FOR A DISC BRAKE

CROSS REFERENCE TO RELATED APPLICATIONS

This application is a continuation of U.S. application Ser. No. 15/086,317, filed Mar. 31, 2016, which is a PCT International Application No. PCT/EP2014/071037, filed Oct. 1, 2014, which claims priority under 35 U.S.C. § 119 from German Patent Application No. 10 2013 016 312.9, filed Oct. 4, 2013, the entire disclosures of which are herein expressly incorporated by reference.

BACKGROUND AND SUMMARY OF THE INVENTION

The present invention relates to a sliding-caliper disk brake located on a fixed brake carrier. The invention also relates to a brake pad set of a disk brake of said type.

Force-transmitting components of such disk brakes are normally produced in one-piece form by a primary forming process, preferably in a sand casting process. The material used is preferably cast iron with spheroidal graphite or nodular cast iron. The cast blank thus produced subsequently undergoes a cutting finish machining process, such that, for example, an installable brake carrier or an installable brake caliper is produced. Such one-piece brake carriers or brake calipers composed of nodular cast iron according to the prior art have basically proven successful, but have certain disadvantages which have an adverse effect in particular in the field of use of heavy utility vehicles.

For example, the brake carriers or brake calipers according to the prior art, owing to the strength demands on the brake carrier and owing to a restricted structural space for the brake carrier and the resulting previous geometric design, have a weight which may be improved upon.

Also mentioned here is European patent publication no. EP 0 139 890 A1, which discloses, inter alia, brake pads of different size.

It is thus desirable—in particular also with regard to the optimization of the payload of a utility vehicle—to provide a weight-optimized and cost-optimized brake carrier and a weight-optimized and cost-optimized brake caliper, in particular for utility vehicle brakes, which overcomes the disadvantages mentioned above.

The invention is therefore based on the object of creating an improved disk brake having a weight-optimized and cost-optimized brake carrier and a weight-optimized and cost-optimized brake caliper.

It is a further object of the invention to provide a brake pad set for a disk brake of said type.

The invention achieves said objects by a relatively wide brake pad slot on a reaction side of the brake carrier, wherein it is advantageously possible for the volume of the reaction-side brake pad to be made larger than the volume of the application-side brake pad. This gives rise to further advantages such as, for example, improved heat dissipation in the direction of the brake caliper rear section, such that the application mechanism of the disk brake, and in particular the seals thereof, are conserved. Furthermore, the resulting tilting moment that acts on the brake caliper during the braking process is reduced, because the pressure point of the reaction-side brake pad is advantageously changed.

A disk brake according to the invention, in particular sliding-caliper disk brake, comprises at least one positionally fixed brake carrier which has two pairs of carrier horns by which a reaction-side brake pad and an application-side brake pad are held, a brake caliper which is formed by tension struts and by a brake caliper rear section, and an application mechanism. The spacing between the carrier horns which receive the reaction-side brake pad is greater than the spacing between the carrier horns which receive the application-side brake pad.

In one embodiment, the carrier horns on a reaction side of the brake carrier are of shorter form than those on an application side of the brake carrier. The shortening of the carrier horns results in a lower bending moment that acts on the foot of a carrier horn during braking, such that the respective shortened carrier horn exhibits less deformation, or less mechanical stress, than in the prior art.

In a further embodiment, a volume of the reaction-side brake pad is greater than a volume of the application-side brake pad. The reduction in thickness of the reaction-side brake pad makes it possible to reduce a structural space on the reaction side of the brake caliper, which can be filled in order to realize targeted stiffening of the brake caliper rear section and of the tension struts of the brake caliper.

If the thickness of the reaction-side brake pad is maintained, greater performance, or a longer service life, of the reaction-side brake pad is realized. This is desirable because the reaction-side brake pad, owing to its position and the associated exposure to dirt, conventionally wears more quickly than the application-side brake pad during the operation of the disk brake. Furthermore, the enlarged reaction-side brake pad absorbs more heat, such that the specific release of heat from the reaction-side brake pad can likewise be increased, and, correspondingly, more heat can be discharged into the brake caliper rear section. This conserves the application mechanism, in particular the seals thereof.

In a yet further embodiment, it is provided that connecting points between the tension struts and the brake caliper rear section are rounded with a three-center curve or with an elliptical segment. By these geometric measures, it is furthermore the case that a stress level is correspondingly lowered, which has an advantageous effect in the weight balance of the brake caliper. For this purpose, in a further embodiment, the tension struts may each have an optimized geometry which narrows toward the brake caliper rear section and which finally opens into the three-center curve or into the elliptical segment.

In one embodiment, the optimized geometry with the three-center curves at the sides forms a type of elliptical opening of the brake caliper rear section of the brake caliper, wherein an application-side longitudinal side of the opening of the brake caliper rear section is shorter than a reaction-side longitudinal side of the opening of the brake caliper rear section. This yields advantageously straightforward confusion-free installation of the brake pads during maintenance or during new installation. The geometry of the opening prevents the relatively wide brake pad from being installed in place of the relatively short brake pad, and thus predefines the correct installation location.

A resultant tilting moment which acts on the brake caliper rear section during a braking process can be reduced by way of the geometry of the reaction-side brake pad. This, too, can have a positive influence on a structural size.

In one embodiment, the brake carrier and the brake caliper are produced by way of a casting process. Here, a ductile cast material may be used for the brake carrier and the brake caliper. A cast iron with spheroidal graphite is also possible. Combinations of these various materials are also conceivable.

In a further embodiment, the reaction-side brake pad and the application-side brake pad and the two pairs of carrier horns each bear against one another at support surfaces. Clear guidance and confusion-free installation are thus possible.

A brake pad set according to the invention of a disk brake as described above has a first brake pad and a second brake pad. The first brake pad has a width greater than a width of the second brake pad. This firstly permits confusion-free installation. Secondly, a resultant tilting moment on the brake caliper rear section can be reduced. Likewise, the service life of the two brake pads can be influenced such that uniform wear is achieved.

In one embodiment, the first brake pad has a volume greater than a volume of the second brake pad. It is thereby possible to influence an absorption of heat in the presence of different levels of heat generation.

Furthermore, the first brake pad is provided as a reaction-side brake pad for the associated disk brake, and the second brake pad is provided as an application-side brake pad for the associated disk brake. It is thus possible for the different geometries of the brake pads to serve for a uniform force distribution.

Other objects, advantages and novel features of the present invention will become apparent from the following detailed description of one or more preferred embodiments when considered in conjunction with the accompanying drawings.

BRIEF DESCRIPTION OF THE DRAWINGS

FIGS. 2-2a are illustrations of a brake carrier according to the prior art;

FIG. 8 shows a plan view of the disk brake according to the invention as per FIG. 6.

DETAILED DESCRIPTION OF THE DRAWINGS

Below, expressions such as "top", "bottom", "right", "left", etc. are used, which relate to orientations in the figures. The letter index "R" refers to a reaction side R of a disk brake, wherein the letter index "Z" refers to an application side of a disk brake. Coordinates x, y, z in the figures serve for further orientation.

Figure 1:
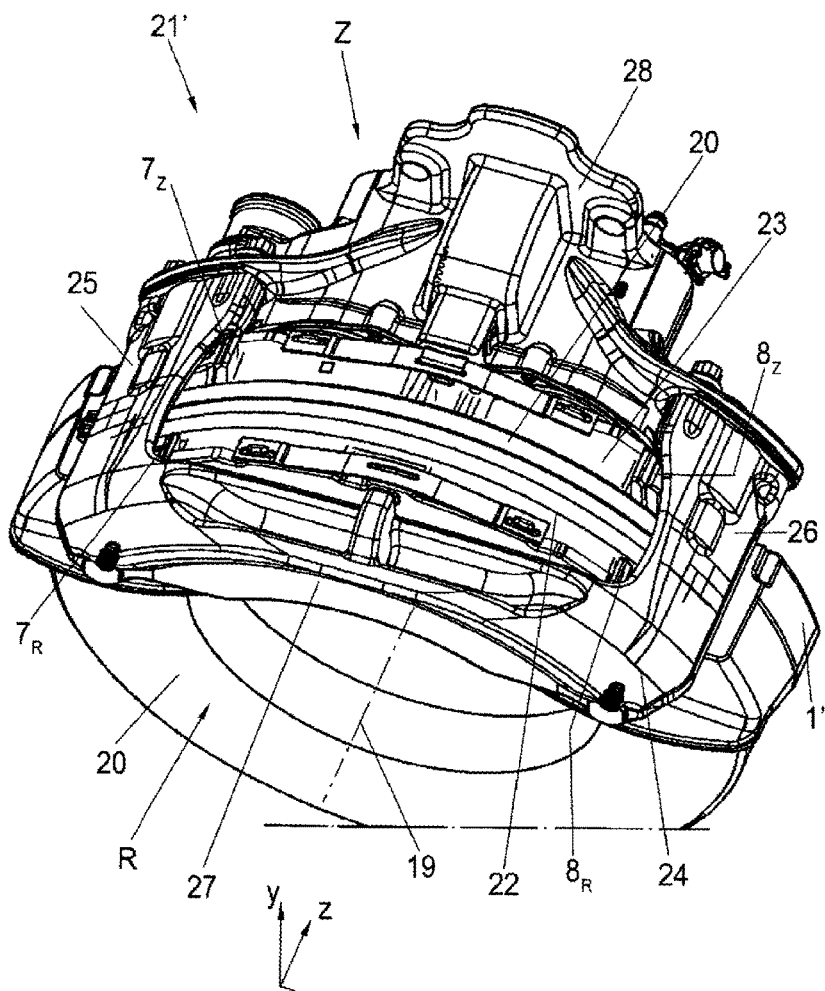
FIG. 1 shows a three-dimensional view of a disk brake according to the prior art.

FIG. 1 shows a three-dimensional view of a disk brake 21' according to the prior art.

The disk brake 21' is assigned to, for example, a vehicle, in particular utility vehicle, and comprises a brake carrier 1', a brake caliper 24 and at least two brake pads 22, 23.

The brake carrier 1' is positionally fixed, in a manner not discussed in any more detail. In the manner of a frame, it spans or engages around an axially outer section, in relation to a brake disk axis of rotation 19 which is simultaneously a vehicle wheel axle and which extends in the z direction, of a brake disk 20 which is connected rotationally conjointly to the rotatable vehicle wheel axle. At both sides of the brake disk 20, the brake carrier 1' is equipped with carrier horns $7_R$, $7_Z$ and $8_R$, $8_Z$ which extend in the y direction and which serve for supporting the two brake pads 22, 23. The brake carrier 1' will be described in more detail in conjunction with FIGS. 2 and 2a.

Here, the brake caliper 24 is in the form of a sliding caliper, and thus the disk brake 21' can also be referred to as a sliding-caliper disk brake. The brake caliper 24 comprises a brake caliper rear section 27 and an application section 28. The brake caliper rear section 27 is equipped, on each of its ends, with a tension strut 25, 26. The application section 28 is connected to the brake caliper rear section 27 via the tension struts 25, 26, in this case for example by way of screws. The brake caliper rear section 27 and the application section 28 are arranged in each case on one side of the brake disk 20 and parallel thereto, wherein the tension struts 25, 26 extend, parallel to the brake disk axis of rotation 19, over that section of the brake disk 20 which is engaged over or spanned by the brake caliper 24 and by the brake carrier 1'.

The application section 28 of the brake caliper 24 accommodates an application mechanism of the disk brake 21'. The application mechanism serves for the actuation of the disk brake 21' and may be, for example, a brake rotary lever with a compressed-air cylinder. This will not be discussed in any more detail here.

That side of the disk brake 21' on which the application section 28 of the brake caliper 24 with the application mechanism is arranged will hereinafter be referred to as application side Z. The other side of the disk brake 21', on which the brake caliper rear section 27 is provided, will hereinafter be referred to as reaction side R. These expressions "application side" and "reaction side", and further designations in this regard, are common and serve for better orientation.

Accordingly, the brake pad 22 situated on the reaction side R is referred to as reaction-side brake pad 22, and the opposite brake pad is referred to as application-side brake pad 23.

FIG. 2 is a three-dimensional illustration of the brake carrier 1' according to the prior art. FIG. 2a shows a front view thereof. Aside from a rib, the following description can also be transferred to the brake carrier 1 according to the invention (see FIGS. 3 to 5).

In FIGS. 2 to 5, for the sake of clarity, the brake disk 20 and further brake components are not illustrated. Where references are made, these refer to FIG. 1. For further orientation, the application side Z and reaction side R are indicated.

In the manner of a frame, the brake carrier 1, as a disk frame or disk-encompassing portion 5, spans or engages around the axially outer section of the brake disk 20. The disk-encompassing portion 5 comprises two hub arches 6 which are arranged parallel to one another and to the brake disk 20 and which, at their ends, are connected by way of two frame parts 17 which run at right angles to the hub arches 6.

The two hub arches 6 are of curved form. One of the hub arches 6 is situated on the application side Z of the brake carrier 1' (the rear side in FIG. 1), such that it is fastened to the vehicle axle and thus stabilized.

The brake carrier 1' furthermore has, on each side of the brake disk 20, the two carrier horns $7_R$, $7_Z$ and $8_R$, $8_Z$; said carrier horns are integrated into the disk-encompassing portion 5, project upward in the y direction from the frame parts 17 in the region of a surface (hereinafter referred to, by definition, as base surface 4) or plane 4, are in this case arranged symmetrically with respect to in each case one of the hub arches 6, are arranged in each case two one behind the other in a circumferential direction in an x-y plane parallel to the brake surface of the brake disk 20, and serve for the support of the two brake pads 22, 23.

The carrier horns $7_R$, $7_Z$ and $8_R$, $8_Z$ each form, with lower support points 11, 12 of the brake carrier 1', in each case one of two brake pad slots which each support a pad carrier plate of a brake pad 22, 23 (not illustrated) in the circumferential direction, that is to say at the run-in side and run-out side (in relation to the preferred direction of rotation of the brake disk 20 about the brake disk axis of rotation 19), and in a downward direction. Thus, the carrier horns $7_R$ and $8_R$ are assigned to the brake pad slot of the reaction-side brake pad 22 and the carrier horns $7_Z$ and $8_Z$ are assigned to the brake pad slot of the application-side brake pad 23. Here, an internal spacing of the carrier horns $7_R$ and $8_R$ is designated as the width $B'_R$ of the reaction-side brake pad slot, and an internal spacing of the carrier horns $7_Z$ and $8_Z$ is designated as the width $B'_Z$ of the application-side brake pad slot. The widths $B'_R$ and $B'_Z$ extend in the x direction and have an equal length value. In other words, the widths $B'_R$ and $B'_Z$ extend in a tangential direction with respect to the brake disk 20.

The frame part 17, which is arranged in the z direction in relation to the brake disk axis of rotation 19, of the disk-encompassing portion 5 extends (in this case in curved fashion) in the negative y direction, such that, proceeding from the hub arch 6 in each case to an outer edge 3 of the reaction side R of the brake carrier 1', a section with a substantially triangular geometry/triangle 18 is defined, in particular on said reaction side R of the brake carrier 1'.

Here, the frame part 17 or the outer edge 3 forms the shortest side of an imaginary triangle 18. A contour line of a reinforcement rib 2 lies, in the region of the triangular geometry 18 and in relation to the coordinate system, in the region of relatively large-magnitude y values in the positive y direction (arrow tip).

In each case one brake pad 22, 23 is supported in the y direction on in each case two support points 11, 12 on the brake carrier 1, which simultaneously define the spacing of the respective brake pad 22, 23 to the brake disk axis of rotation 19. For the fastening of the brake carrier 1' to a fastening flange (not illustrated) on the vehicle axle, the brake carrier 1' has, at the application side, fastening points 14, 15 by way of which the brake carrier 1' is screwed to the fastening flange.

Bearing bolts for the sliding caliper (brake caliper 24) are fastened (not illustrated here) at fastening points 13. This is known per se to a person skilled in the art and will therefore not be described in any more detail here.

The brake carrier 1' according to the prior art (FIGS. 2 and 2*a*) is a component which is preferably symmetrical with respect to an axis of symmetry S (FIG. 2*a*) running in the y direction. Said brake carrier has, for stabilization, the reinforcement rib 2 on the reaction-side outer side (which reinforcement rib extends in the x direction at right angles to the brake disk axis of rotation 19 and thus tangentially with respect to the brake disk 20). The reinforcement rib 2 has a the continuous contour line over the entire surface of the reaction-side section of the brake carrier 1'.

The contour line of the reinforcement rib 2 begins at the left (or else at the right) (see FIG. 2) at one end 2*a* on the reaction side R at an outer edge 3 of the brake carrier 1' and runs, initially parallel, below or at the same level as the console-like base surface 4 of the disk-encompassing portion 5 toward the center as far as the start of the hub arch 6. Then, the contour profile of the reinforcement rib 2 follows the hub arch 6 at the outer side thereof (that is to say at the outer side averted from the brake disk 20) as far as the central axis of symmetry S (FIG. 2*a*). Then, toward the right from there, in mirror-symmetrical fashion with respect to the axis of symmetry S, the reinforcement rib 2 follows the hub arch 6 as far as the right-hand end 2*a* (FIG. 2).

Owing to the contour profile of the reinforcement rib 2—at the reaction-side outer edges 3 of the brake carrier 1, substantially parallel to the console-like base surface 4 of the disk-encompassing portion 5—it is the case that, during braking processes, stress peaks arise in particular in the region of the carrier horns $7_R$, $7_Z$ and $8_R$, $8_Z$ for the brake pads 22, 23 (not illustrated), which stress peaks originate from the step change in stiffness of the brake carrier 1 in each case below and above the reinforcement rib 2.

Said stress peaks are counteracted for example by way of corresponding wall thickness increases at the reinforcement rib 2, for example in the region of the carrier horns $7_R$, $7_Z$ and $8_R$, $8_Z$.

During braking processes, loads on the brake carrier 1' arise which lead to a parallelogram-like deformation of the base surfaces 4 of the disk-encompassing portion 5. However, owing to its geometry and its contour line, the reinforcement rib 2 does not make a significant contribution to the stiffening of the brake carrier 1' in the region of the reaction-side sides of the frame part 17 which have the triangular geometry 18, such that, in such a load situation, the stress concentration in the brake carrier 1 is likewise increased. The triangular geometry 18 is to be understood in each case to mean an imaginary triangle in the x-y plane, the upper side of which runs in the x direction and forms the straight part of the reinforcement rib 2. The ends of said side are the end 2*a* and the start of the hub arch 6. A further side is formed by the outer edge 3, starting at the end 2*a* and ending at a lower end of said outer edge 3. The third side of the imaginary triangle of the triangular geometry 18 connects said lower end of the outer edge 3 to the start of the hub arch 6. Said triangular geometry 18 exists on both sides of the brake carrier 1' (see also FIG. 2*a*).

With regard to an optimization of mechanical stresses, deformations and a weight of the brake carrier 1', simple measures for stiffening the brake carrier 1', such as for example the adding of additional material, are ruled out owing to the structural space conditions on the reaction side of the brake carrier 1'.

Figure 3:
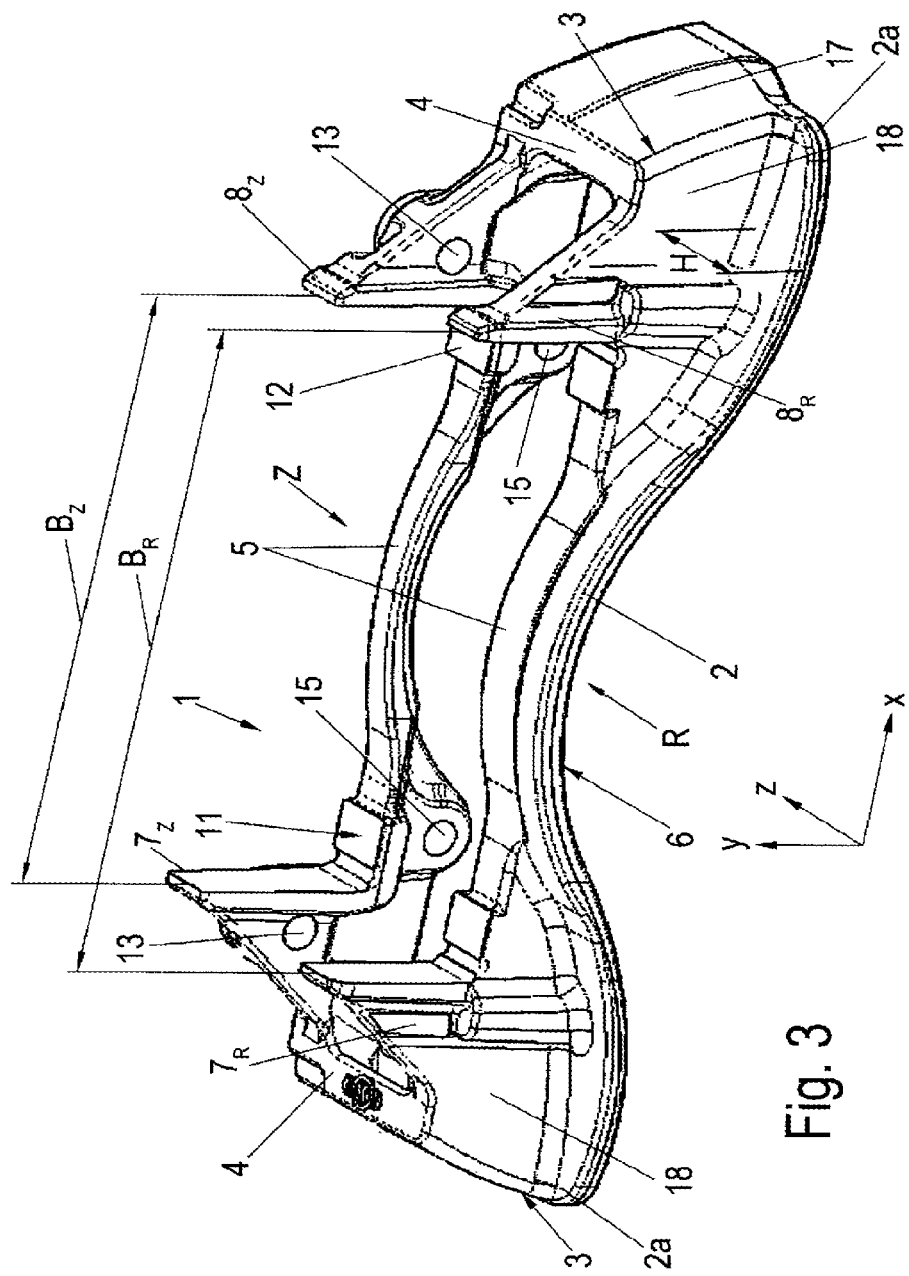
FIG. 3 shows a three-dimensional view of a brake carrier according to an embodiment of the invention.
Figure 4:
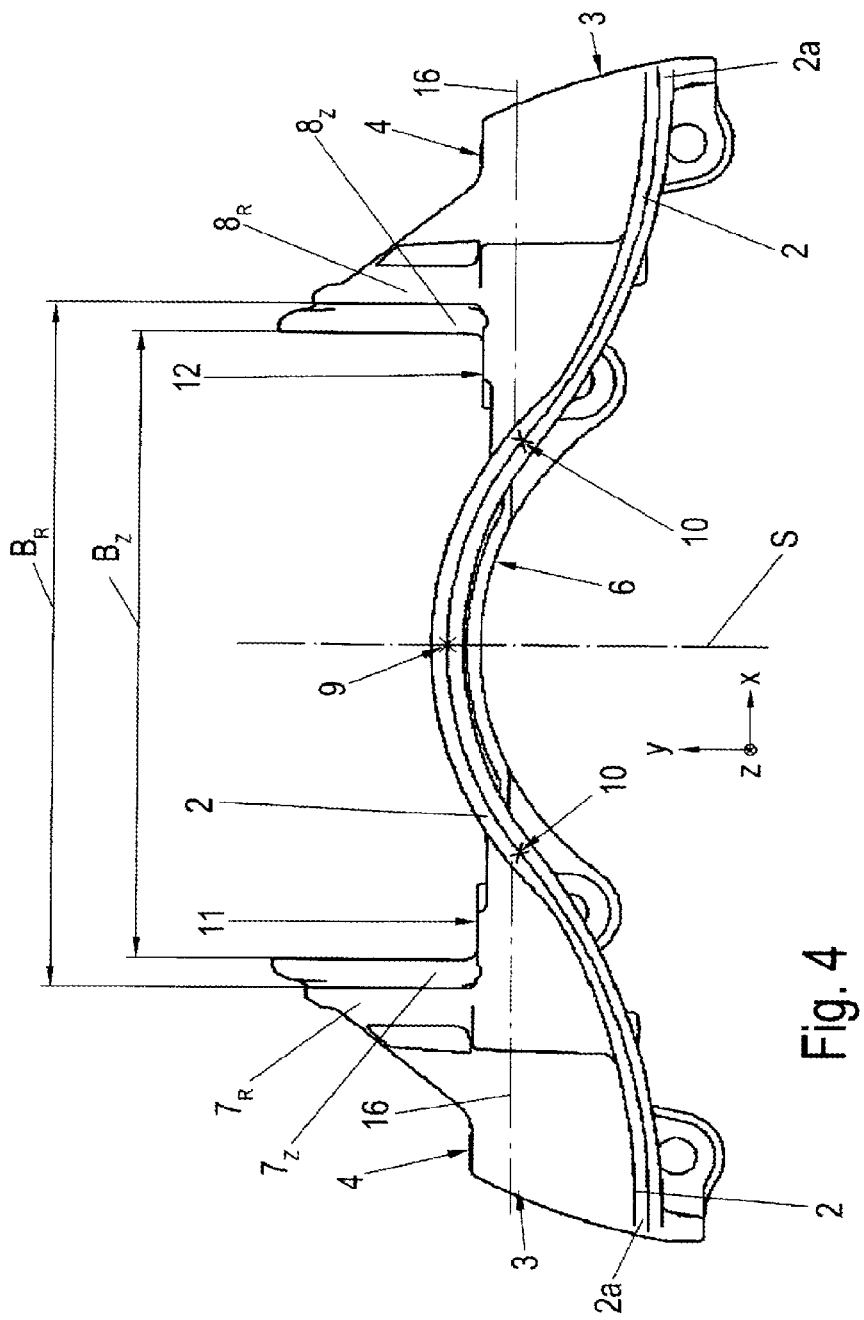
FIG. 4 shows a front view of the brake carrier according to the invention as per FIG. 3.
Figure 5:
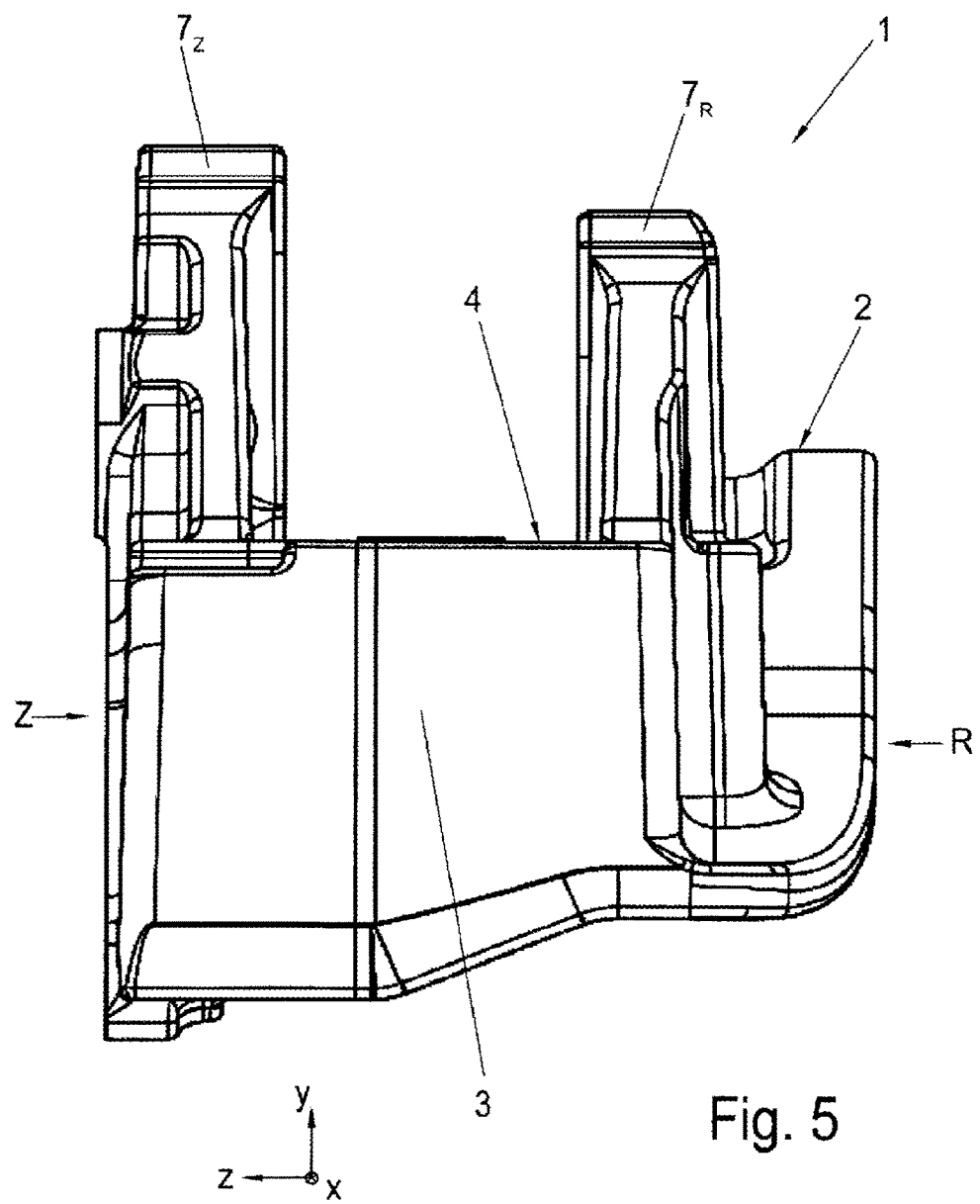
FIG. 5 shows a side view of the brake carrier according to the invention as per FIG. 3.

FIGS. 3, 4 and 5 illustrate a brake carrier 1 according to the invention. Here, FIG. 3 shows a three-dimensional view. FIG. 4 illustrates a front view of the brake carrier 1, and FIG. 5 shows a side view.

The basic geometry of the brake carrier 1 according to the invention corresponds substantially to that of the brake carrier 1' according to the prior art (FIGS. 2 and 2*a*). A difference between the brake carrier 1 according to the invention and the brake carrier 1' according to the prior art consists in the geometry of the contour profile of the reinforcement rib 2 and in the position in which the reinforcement rib 2 is arranged on the reaction side R of the brake carrier 1.

The reinforcement rib 2 on the reaction side R is initially again of mirror-symmetrical form with respect to the axis of symmetry S.

By contrast to the brake carrier 1' according to the prior art (FIGS. 2 and 2*a*), the start of the contour line of the reinforcement rib 2 at the end 2*a* is situated in each case below a line 16 (FIG. 4), which indicates a reference from the prior art, in each case in the lower corner of the outer edge 3 of the brake carrier 1, that is to say, in relation to the line 16, in the region of relatively small-magnitude y values in relation to the case of the conventional brake carrier 1'. This is clarified in FIG. 4.

In other words, the reinforcement rib 2 has two mutually averted ends 2a which are advantageously and preferably formed in each case at the outer lower corners of the outer edge 3 of the brake carrier 1, wherein the reinforcement rib 2 extends from said ends 2a in each case as far as a central apex 9 (FIG. 4) at the axis of symmetry S of the brake carrier 1. At the apex 9, the sign of a gradient of the contour line of the reinforcement rib 2 changes. This arrangement contributes to the reduction in stress peaks in the event of loading of the brake carrier 1.

It is thus preferably the case that the contour line of the reinforcement rib 2 correspondingly begins in the lower half—in particular at the very lower edge as described above—of the triangular geometry 18, which is formed by virtue of the disk-encompassing portion 5 widening at the outer edges 3 of the brake carrier 1 in the direction of relatively small y values in relation to the coordinate system and in relation to the base surface 4 in FIG. 3, wherein the disk-encompassing portion 5, in its extent in the direction of relatively small y values, reaches the base surface 4 approximately in the region at which the hub arch 6 departs from the plane of the base surface 4. In other words, the triangular geometry 18 is, in this case too, in each case an imaginary triangle in the x-y plane. The upper side of said imaginary triangle runs in the x direction, wherein it runs as a straight line at the level of the base surface 4 with an end point at the start of the outer edge 3 and an end point at an imaginary point of intersection with the reinforcement rib 2 in the disk-encompassing portion 5. A further side is formed by the outer edge 3, starting at the top of the end of the straight line at the level of the base surface 4 and ending at the lower end of said outer edge 3 at the end 2a of the reinforcement rib 2. The third side of the imaginary triangle of the triangular geometry 18 connects the end 2a of the reinforcement rib 2 to the imaginary point of intersection with the reinforcement rib 2 in the disk-encompassing portion 5.

The reinforcement rib 2 of the brake carrier 1 according to the invention is of similar contour profile to the graphs of the Gaussian normal distribution function (Gaussian "bell curve").

The contour line is thus one with a profile which rises preferably continuously in each case from the outside to the center toward the central axis of symmetry S, with a central apex 9.

The brake carrier 1 furthermore preferably has two inflection points 10 situated symmetrically with respect to the axis of symmetry S, at each of which inflection points the sign of a gradient of curvature of the contour line of the reinforcement rib 2 changes.

The apex 9 of the contour line of the reinforcement rib 2 coincides centrally with the apex of the hub arch 6. Furthermore, the contour line has two inflection points 10 situated symmetrically with respect to the axis of symmetry S, at which inflection points the sign of the gradient of curvature of the contour line changes.

The outer starting points or ends 2a of the reinforcement rib 2 of the brake carrier 1 according to the invention lie below the base surface 4 of the disk-encompassing portion 5 by for example at least 15 mm, preferably by less than 25 mm, in relation to the profile of the contour line in the region of the triangular geometry 18.

The contour line of the reinforcement rib 2 runs with a positive gradient in preferably continuously rising fashion, before then, after a change in sign of the gradient of curvature at the inflection point 10, following the hub arch 6 to the central apex 9, which coincides with the axis of symmetry S of the brake carrier 1.

The contour profile or line of the reinforcement rib 2 is in each case mirror-symmetrical with respect to the axis of symmetry S.

It is particularly advantageous for the continuous contour line to have an in each case preferably continuously rising profile from the two outer ends 2a toward the central axis of symmetry S.

Here, it is preferably the case that the two ends 2a of the stiffening rib 2 are situated in each case at outer lower corners of the brake carrier 1. The reinforcement rib 2 extends from said ends 2a in each case as far as the central apex 9 at the axis of symmetry S of the brake carrier 1, at which the sign of the gradient of the contour line changes.

The reinforcement rib 2 is in turn arranged on the reaction side R of the brake carrier 1 so as to be elevated in relation to the brake disk 20 in the direction of the brake disk axis of rotation 19, that is to say in the z direction. The expression "elevated" refers here to an extent H in the negative z direction.

Here, the reinforcement rib 2 has the extent H, which extends in the negative z direction, over the entire contour line of the reinforcement rib 2, wherein the extent H is for example at least 5 mm, preferably between 7 and 12 mm. The cross section of the reinforcement rib 2 thus has a greater cross-sectional area than the reinforcement rib 2 of a brake carrier 1' according to the prior art.

The enlarged cross-sectional area of the reinforcement rib 2 leads, in conjunction with the continuously rising profile of the contour line of the reinforcement rib 2, in each case from the outside as far as the center, to a homogeneous deformation, that is to say a deformation which is relatively uniform in terms of magnitude, of the brake carrier 1 under load. As a result, no significant stress peaks arise in the brake carrier 1 under load.

With regard to the avoidance of stresses, it is furthermore advantageous that the hub arch 6 which has the reinforcement rib 2 again transitions, in the outward direction from the axis of symmetry S, in each case into a section with an outwardly widening triangular geometry 18, wherein the outer ends 2a of the reinforcement rib 2 lie for example at least 15 mm, preferably 20 mm and particularly preferably as much as 25 mm below the base surface 4 of the disk-encompassing portion 5, on which base surface the carrier horns $7_R$, $7_Z$ and $8_R$, $8_Z$ are constructed, or from which base surface said carrier horns proceed. The two mutually averted outer ends 2a of the reinforcement rib 2 are thus advantageously situated considerably lower than those according to the known prior art.

It is accordingly possible—as is necessary in the case of the brake carriers 1' according to the prior art—to dispense with corresponding wall thickness increases in the respective regions of the disk-encompassing portion 5 with step changes in stiffness and correspondingly high stress peaks.

The design according to the invention of the reinforcement rib 2 thus makes it possible—if the same deformation as in the case of a brake carrier 1' according to the prior art is permitted—for wall thicknesses in the region of the reaction side R of the brake carrier 1 to be reduced in targeted fashion in relation to brake carriers 1' according to the prior art, because, even in the case of corresponding deformations, no increased stress peaks arise, and it is thus made possible for material to be saved in targeted fashion at the reaction side R of the brake carrier in order to thereby realize a weight-optimized and cost-optimized brake carrier 1.

It is thus possible for the brake carrier 1 according to the invention to be acted on with higher cyclically acting forces without the need to accept a shortened service life. This yields the possibility of higher performance of the brake carrier 1 according to the invention with an optimized power-to-weight ratio.

In FIG. 5, it is possible to clearly see the different heights of the carrier horns $7_R$ and $7_Z$ in the positive y direction (which self-evidently likewise applies to the carrier horns $8_R$ and $8_Z$). This will be discussed in more detail further below.

Figure 6:
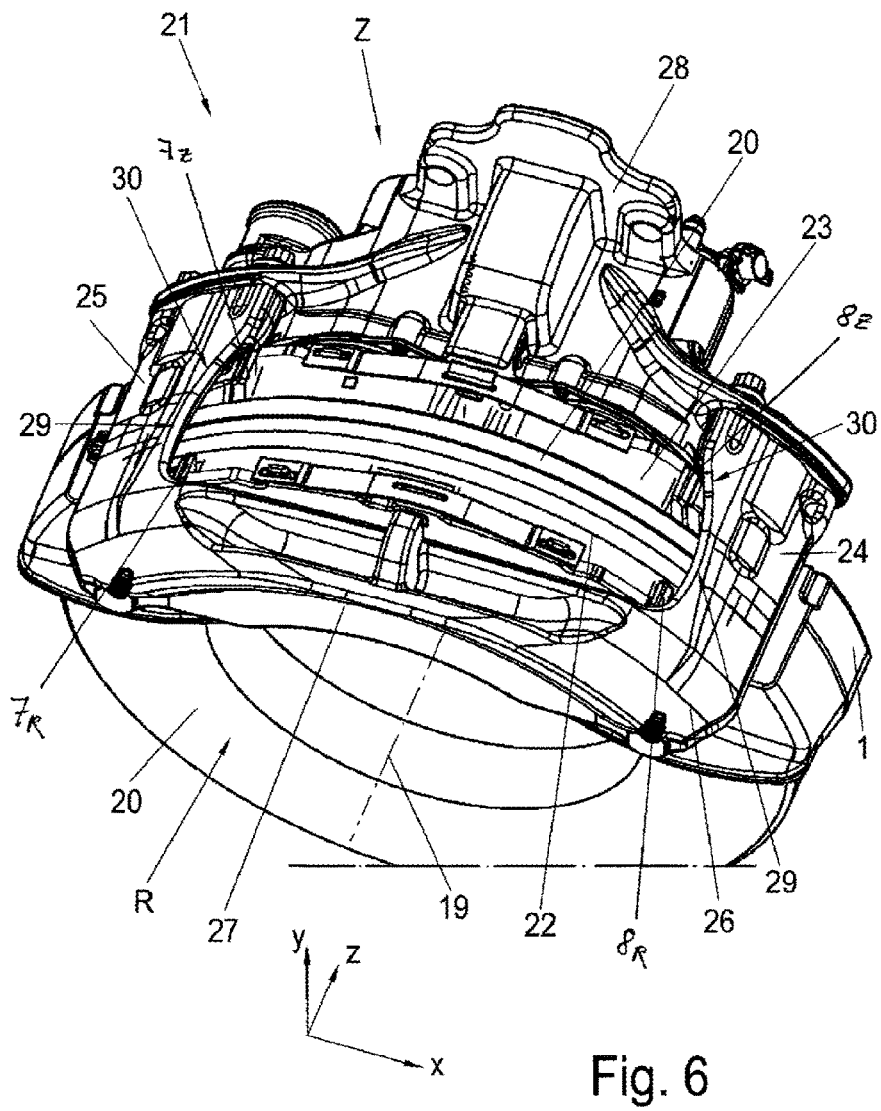
FIG. 6 shows a three-dimensional view of a disk brake according to an embodiment of the invention.
Figure 7:
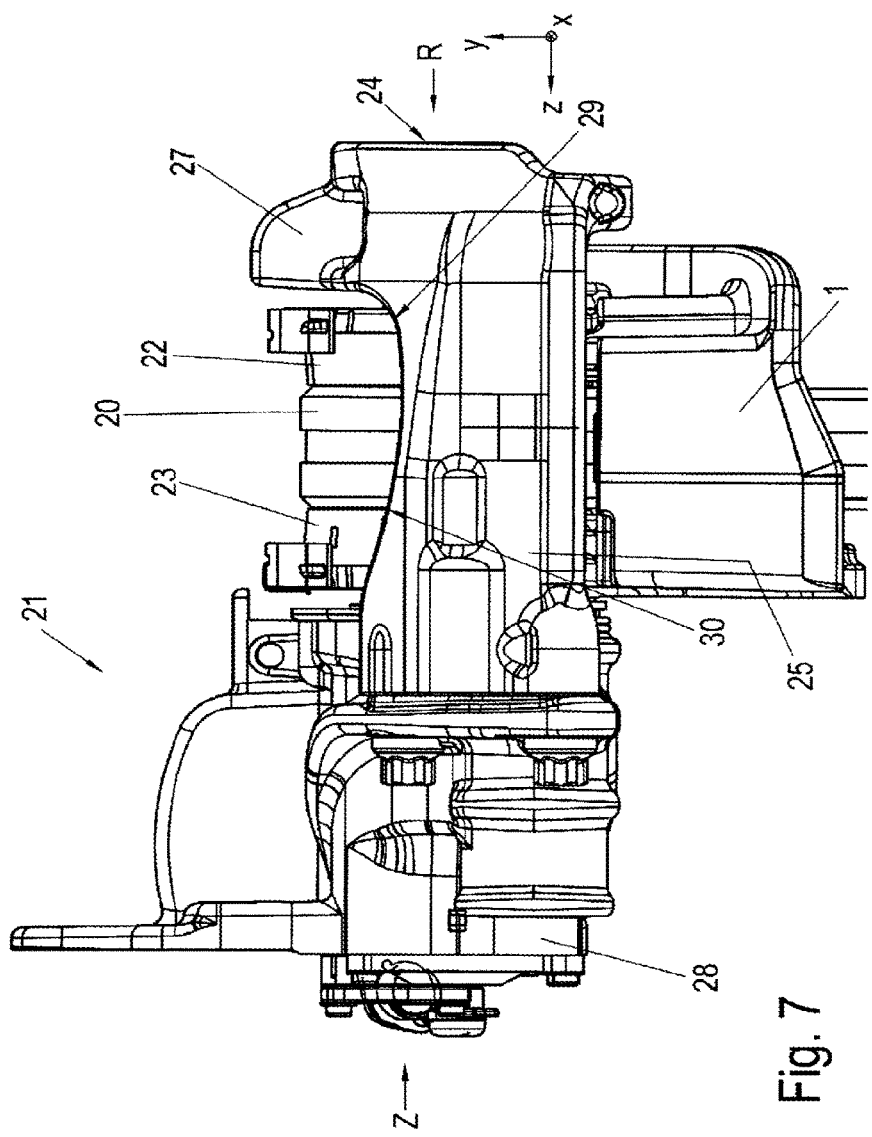
FIG. 7 shows a side view of the disk brake according to the invention as per FIG. 6.

FIG. 6 shows a three-dimensional view of a disk brake 21 according to an embodiment of the invention. In this regard, FIG. 7 shows a side view of the disk brake 21 according to the invention as per FIG. 6. FIG. 8 shows a plan view of the disk brake 21 according to the invention as per FIG. 6.

In FIG. 6, it is possible in particular to clearly see the cross-sectional geometry of the reaction side R of the brake caliper rear section 27.

With regard to further components of the disk brake 21 according to an embodiment the invention, in particular a sliding-caliper disk brake with positionally fixed brake carrier 1, further optimization possibilities arise, which will be described in more detail below.

The construction of the disk brake 21 according to the invention under discussion here has already been discussed above in conjunction with FIG. 1.

The stiffer design of the brake carrier 1 makes it possible for the brake pad 22 on the reaction side R of the brake carrier 1, or the reaction-side brake pad 22, to be designed to be wider than the application-side brake pad 23 on the application side Z of the brake carrier 1. In this context, wider means that the reaction-side brake pad 22 extends over a larger section than the application-side brake pad 23 in each case in the positive and negative x directions.

The expression "brake pad volume" relates to the friction pad, which extends in the x direction, the y direction and the z direction. The expression "pad thickness" or "thickness of a brake pad" is to be understood to mean the extent of the respective brake pad 22, 23 in the z direction.

Assuming a uniform brake pad volume, it is possible for the carrier horns $7_R$ and $8_R$ on the reaction side R of the brake carrier 1 to be designed to be relatively short, as illustrated in FIG. 4 and in particular in FIG. 5. In this context, "relatively short" means that the carrier horns $7_R$ and $8_R$ on the reaction side R of the brake carrier 1 extend less far in the positive y direction than the carrier horns $7_Z$ and $8_Z$ on the application side Z of the brake carrier 1. The shortening of the carrier horns $7_R$ and $8_R$ yields a lower bending moment that acts on the foot of a carrier horn $7_R$ and $8_R$ during braking, such that the respective shortened carrier horn $7_R$ and $8_R$ exhibits less deformation or mechanical stress than in the case of the prior art. This makes it possible for the tension struts 25, 26 of the brake caliper 21 to be correspondingly reinforced in the region of the carrier horns $7_R$ and $8_R$ of the reaction-side brake pad 22, such that the deformation of the tension struts 25, 26 under load is less pronounced.

As a result of the increase of the width $B_R$ of the brake pad slot for the reaction-side brake pad 22, said width being defined by the spacing of the carrier horns $7_R$ and $8_R$ in the x direction (see FIG. 3), it is possible, while maintaining the brake pad volume of the reaction-side brake pad 22, for the thickness of the reaction-side brake pad 22 to be reduced. The reduction of the pad thickness of the reaction-side brake pad 22 makes it possible for the depth of the disk-encompassing portion 5 in the direction of the z axis to be reduced. In association with the reduction in height of the associated reaction-side carrier horns $7_R$ and $8_R$, a structural space on the reaction side of the brake caliper 24 becomes free, which structural space is filled for the purposes of targetedly stiffening the brake caliper rear section 27 and the tension struts 25, 26 of the brake caliper 24.

If the thickness of the reaction-side brake pad 22 is maintained, greater performance, or a longer service life, of the reaction-side brake pad 22 is realized. This is desirable because the reaction-side brake pad 22, owing to its position and the associated exposure to dirt, conventionally wears more quickly than the application-side brake pad 23 during the operation of the disk brake 21. Furthermore, the enlarged reaction-side brake pad 22 absorbs more heat, such that the specific release of heat from the reaction-side brake pad 22 can likewise be increased, and, correspondingly, more heat can be discharged into the brake caliper rear section 27. This conserves the application mechanism, in particular the seals thereof.

Through the use of an application-side brake pad 23 which is of small pad surface area and of a relatively large reaction-side brake pad 22, the brake caliper 24 is provided with a geometry 30 appropriate for the loading, or optimized for the loading, in particular at the connecting points between the tension struts 25, 26 and the brake caliper rear section 27. In particular, in plan view (FIG. 8), said regions are rounded with a three-center curve or with an elliptical segment 29, which give rise to relatively only low notch stresses and therefore contribute to the strength optimization of the brake caliper 24.

Furthermore, the tension struts 25, 26 are provided, in plan view (FIG. 6 or FIG. 8), with a strength-optimized geometry 30 which narrows toward the brake caliper rear section and which finally opens into the three-center curve 29 for the rounding of the transition between the tension strut 25, 26 and the brake caliper rear section 27. Furthermore, the geometry of the tension struts 25, 26 in the side view (FIG. 7) is likewise of load-optimized design, analogously to the geometry in the plan view.

The optimized geometry 30 with the three-center curves 29 at the sides contributes to the formation of a type of elliptical opening of the brake caliper 24. This can be seen in particular in the plan view in FIG. 8. Said opening of the brake caliper rear section 27 of the brake caliper 24 is shorter in the x direction at the longitudinal side in the region of the application-side brake pad 23 than at the opposite longitudinal side in the region of the reaction-side brake pad 22. This yields a clear assignment of the brake pads 22, 23 during installation or exchange. The reaction-side brake pad 22, which is relatively long in the x direction, can be installed only on the reaction side R owing to the design of the opening of the brake caliper rear section 27 of the brake caliper 24. Installation on the application side Z is not possible owing to the geometry of the opening. Confusion-free installation of the brake pads 22, 23 is thus realized.

The brake pads 22 and 23 and the associated carrier horns $7_R$, $7_Z$; $8_R$, $8_Z$ each bear against one another at support surfaces, as can easily be seen.

Owing to the altogether stiffer and thus strength-optimized geometry of the brake caliper 24 and of the brake carrier 1, weight can be saved on the brake carrier 1 and on the brake caliper 24. The weight reduction yields lower production costs and a reduction in vehicle weight, which is an advantageous and therefore highly sought-after product characteristic in particular in the field of heavy utility vehicles.

Owing to the optimized stiffness of the brake caliper 24, the provision of actuating travel owing to the elasticity of the brake caliper 24 can be reduced. This makes it possible for the application mechanism and thus the disk brake 21 to be of altogether more compact design in the z direction, such that, overall, less structural space has to be provided for the disk brake 21 according to the invention. This is likewise of great advantage in the field of heavy utility vehicles.

As a result of the increase in width of the reaction-side brake pad 22, that is to say in the x direction, that is to say tangentially with respect to the brake disk 20, a greater proportion of the surface area of the reaction-side brake pad 22 is situated below the pressure center point of the application mechanism in the application section 28 of the brake caliper 24, whereby the resultant tilting moment on the brake caliper rear section 27 is reduced.

The advantageous geometry of the brake carrier 1 or of the brake caliper 24 can be realized particularly easily in terms of manufacture by way of, for example, a casting process. The brake carrier 1 according to the invention is preferably produced from a ductile cast material, for example cast iron with spheroidal graphite.

The foregoing disclosure has been set forth merely to illustrate the invention and is not intended to be limiting. For example, it is conceivable that other materials may be used for producing the brake carrier 1 and the brake caliper 24. Since modifications of the disclosed embodiments incorporating the spirit and substance of the invention may occur to persons skilled in the art, the invention should be construed to include everything within the scope of the appended claims and equivalents thereof.

LIST OF REFERENCE DESIGNATIONS 1, 1' Brake carrier
2 Reinforcement rib
2a End
3 Outer edge
4 Base surface
5 Disk-encompassing portion
6 Hub arch
$7_R$, $7_Z$ Carrier horn
$8_R$, $8_Z$ Carrier horn
9 Apex
10 Inflection point
11, 12 Support point
13, 14, 15 Fastening point
16 Line
17 Frame part
18 Triangular geometry
19 Brake disk axis of rotation
20 Brake disk
21, 21' Disk brake
22, 23 Brake pad
24 Brake caliper
25, 26 Tension strut
27 Brake caliper rear section
28 Application section
29 Three-center curve or elliptical segment
30 Optimized geometry
$B_R$, $B'_R$, $B_Z$, $B'_Z$ Width
H Extent
R Reaction side
S Axis of symmetry
Z Application side
x, y, z Coordinates

What is claimed is:

1. A sliding-caliper disk brake, comprising:
an application-side brake pad and a reaction-side brake pad;
a fixed brake carrier including two pairs of carrier horns, a reaction-side one of the pairs of carrier horns being configured to abut respective lateral sides of a reaction-side brake pad and an application-side one of the pairs of carrier horns being configured to abut respective lateral sides of an application-side brake pad, and two hub arches, a reaction-side one of the hub arches extending between the reaction-side pair of carrier horns and an application-side one of the two hub arches extending between the application-side pair of carrier horns; and
a brake caliper including a brake caliper rear section, a brake caliper application section configured to receive a brake application mechanism and tension struts connecting the brake caliper rear section and the brake caliper application section,
wherein
the reaction-side carrier horns and the reaction-side hub arch form a reaction-side brake pad slot configured to support a radially-inner side and the lateral sides of the reaction side brake pad, and the application-side carrier horns and the application-side hub arch form an application-side brake pad slot configured to support a radially-inner side and the lateral sides of the application side brake pad,
a spacing between opposing radially outer ends of brake pad abutment surfaces of the reaction-side pair of carrier horns is greater than a spacing between opposing radially outer ends of brake pad abutment surfaces of the application-side pair of carrier horns, and
a radial height of the reaction-side pair of carrier horns is shorter than a radial height of the application-side pair of carrier horns.

2. The disk brake as claimed in claim 1, wherein
the reaction-side brake pad has a width greater than a width of the application-side brake pad.

3. The disk brake as claimed in claim 1, wherein
a volume of the reaction-side brake pad is greater than a volume of the application-side brake pad.

4. The disk brake as claimed in claim 2, wherein
a volume of the reaction-side brake pad is greater than a volume of the application-side brake pad.

5. The disk brake as claimed in claim 4, wherein
the brake caliper rear section and the brake caliper application section are arranged on opposite sides of a brake disk, and
the tension struts extend over the brake disk parallel to a rotation axis of the brake disk.

6. The disk brake as claimed in claim 5, wherein
a transition region between each of the tension struts and the brake caliper rear section is arranged as a three-center curve or as an elliptical segment.

7. The disk brake as claimed in claim 6, wherein
the tension struts narrow in a direction from the brake caliper application section toward the brake caliper rear section until the tension struts reach the three-center curve or the elliptical segment.

8. The disk brake as claimed in claim 7, wherein
an opening formed inside a perimeter of the brake caliper application section, the brake caliper rear section and the tension struts is generally elliptical, and
an application-side longitudinal side of the opening is shorter than a reaction-side longitudinal side of the opening.

9. The disk brake as claimed in claim 1, wherein
a tilting moment which acts on the brake caliper rear section during braking is lower than a tilting moment that would act on a corresponding brake caliper rear section configured to receive a reaction-side brake pad configured in the manner of the application-side brake pad.

10. The disk brake as claimed in claim 1, wherein
the brake carrier and the brake caliper are cast components.

11. The disk brake as claimed in claim 10, wherein
a material of the brake carrier and the brake caliper is a ductile cast material.

12. The disk brake as claimed in claim 10, wherein
the material of the brake carrier and the brake carrier is cast iron with spheroidal graphite.

13. A brake pad set of a disk brake, comprising:
a first brake pad and a second brake pad configured for installation into a disk brake having a fixed brake carrier including two pairs of carrier horns, a reaction-side one of the pairs of carrier horns being configured to abut respective lateral sides of the first brake pad and an application-side one of the pairs of carrier horns being configured to abut respective lateral sides of the second brake pad, the fixed brake carrier further including two hub arches, a reaction-side one of the hub arches extending between the reaction-side pair of carrier horns and an application-side one of the two hub arches extending between the application-side pair of carrier horns, and the disk brake further including a brake caliper including a brake caliper rear section, a brake caliper application section configured to receive a brake application mechanism and tension struts connecting the brake caliper rear section and the brake caliper application section, wherein the reaction-side carrier horns and the reaction-side hub arch forming a reaction-side brake pad slot configured to support a radially-inner side and the lateral sides of the first brake pad, the application-side carrier horns and the application-side hub arch forming an application-side brake pad slot configured to support a radially-inner side and the lateral sides of the second brake pads, a spacing between opposing radial outer ends of brake pad abutment surfaces of the reaction side pair of carrier horns is greater than a spacing between opposing radial outer ends of brake pad abutment surfaces of the application side pair of carrier horns, and a radial height of the reaction-side pair of carrier horns is shorter than a radial height of the application-side pair of carrier horns,
wherein the first brake pad has a width between lateral ends configured to abut the reaction-side pairs of brake horns greater than a width of the second brake pad between lateral ends configured to abut the application-side pairs of brake horns.

14. The brake pad set of a disk brake as claimed in claim 13, wherein
the first brake pad has a volume greater than a volume of the second brake pad.

* * * * *